United States Patent

Stauffer

[11] Patent Number: 6,010,604
[45] Date of Patent: Jan. 4, 2000

[54] NEURAL NETWORK PACKING

[76] Inventor: John E. Stauffer, 6 Pecksland Rd., Greenwich, Conn. 06831

[21] Appl. No.: 09/018,830

[22] Filed: Feb. 4, 1998

[51] Int. Cl.[7] ....................................................... C25B 9/00
[52] U.S. Cl. ........................... 204/242; 204/254; 96/122; 96/135; 96/153; 422/177; 55/522; 55/527
[58] Field of Search ..................................... 204/242, 249, 204/263, 254; 205/764, 554, 763; 423/235, 239.1, 242.1, 244.01; 96/122, 135, 153; 422/139, 147, 168, 177, 190; 55/522, 527

[56] References Cited

U.S. PATENT DOCUMENTS

| | | |
|---|---|---|
| 3,915,822 | 10/1975 | Veltman ................. 205/701 |
| 4,925,639 | 5/1990 | Stauffer . |
| 5,344,529 | 9/1994 | Stauffer . |

*Primary Examiner*—Bruce F. Bell
*Attorney, Agent, or Firm*—Young & Basile, P.C.

[57] ABSTRACT

A column packing for use in the scrubbing of gases by aqueous liquid, the packing comprising material that is electrically conductive and material that is non-conductive with such materials being intimately mixed with each other, such that the packing as a whole provides the gas-liquid surface for absorption and the conductive material in particular serves as a bipolar electrode for electrolysis.

6 Claims, 3 Drawing Sheets

NEURAL NETWORK PACKING

FIELD OF THE INVENTION

A new and improved column packing has been developed for the scrubbing of waste gases by a liquid. This packing comprises both material that is electrically conductive and material that is non-conductive. These two types of packing materials are intermixed such that the pieces or elements of the conductive material are dispersed throughout the column packing. The total packing provides the gas-liquid interface for absorption. The conductive material also functions as a bipolar electrode in order to electrolyze dissolved gas such as sulfur dioxide or nitric oxide.

BACKGROUND OF THE INVENTION

Processes have been disclosed in the prior art for the removal of sulfur dioxide from waste gases (U.S. Pat. No. 5,344,529) and for the removal of nitric oxide from waste gases (U.S. Pat. No. 4,925,639). These processes have in common the use of a column packing that is electrically conductive. Such packing not only serves as a surface for absorption of sulfur dioxide or nitric oxide but also enables the simultaneous electrolysis of the dissolved gases. In this manner these processes overcome the limited solubility of these gases.

Notwithstanding the advantages of the prior art, certain drawbacks have been encountered. In the case of the removal of sulfur dioxide from waste gases and its recovery as sulfuric acid, a bipolar process using conductive packing was disclosed. This loose packing material is dumped into a column that contains two electrical contacts. As current is passed through the column packing, the pieces in the column take on positively and negatively charged sites at which the desired electrochemical reactions occur.

The effectiveness of the bipolar process will depend in part on the current efficiency. Should packing material with high electrical conductivity be used, the packing will tend to act like a short circuit, and limited electrolysis will take place. This problem is illustrated by the use of packing fabricated from nickel base superalloys. This material has an electrical resistivity of 133 micro ohm-cm compared with 1.35 ohm-cm for 30 percent sulfuric acid. Thus the conductivity of the packing is close to $10^4$ greater than the acid.

Even using graphite as a packing material, the bed will function as a shunt. Having a resistivity at about 1400 micro ohm-cm, graphite will show only marginal improvement over the most promising nickel alloys. As a guiding principle, the distribution of current in parallel electrical circuits is inversely proportional to the resistivities.

The process for nitric oxide removal avoids the problem of the packing conductivity by using the packing only as the anode. The cathode is located externally to the column. The efficiency of this process suffers, however, from the electrical resistance of the acid in the lines which connect the column to the compartment which contains the cathode.

It is therefore an object of the present invention to overcome the limitations of the prior art, particularly with respect to the electrical efficiency.

At the same time it is an object to provide a means that preserves the improvements of the prior art including reduced acid circulation, high scrubbing efficiency, and compact design.

These and other objects, features and advantages of the invention will be apparent from the accompanying drawings and the following description.

SUMMARY OF THE INVENTION

Figure 1:
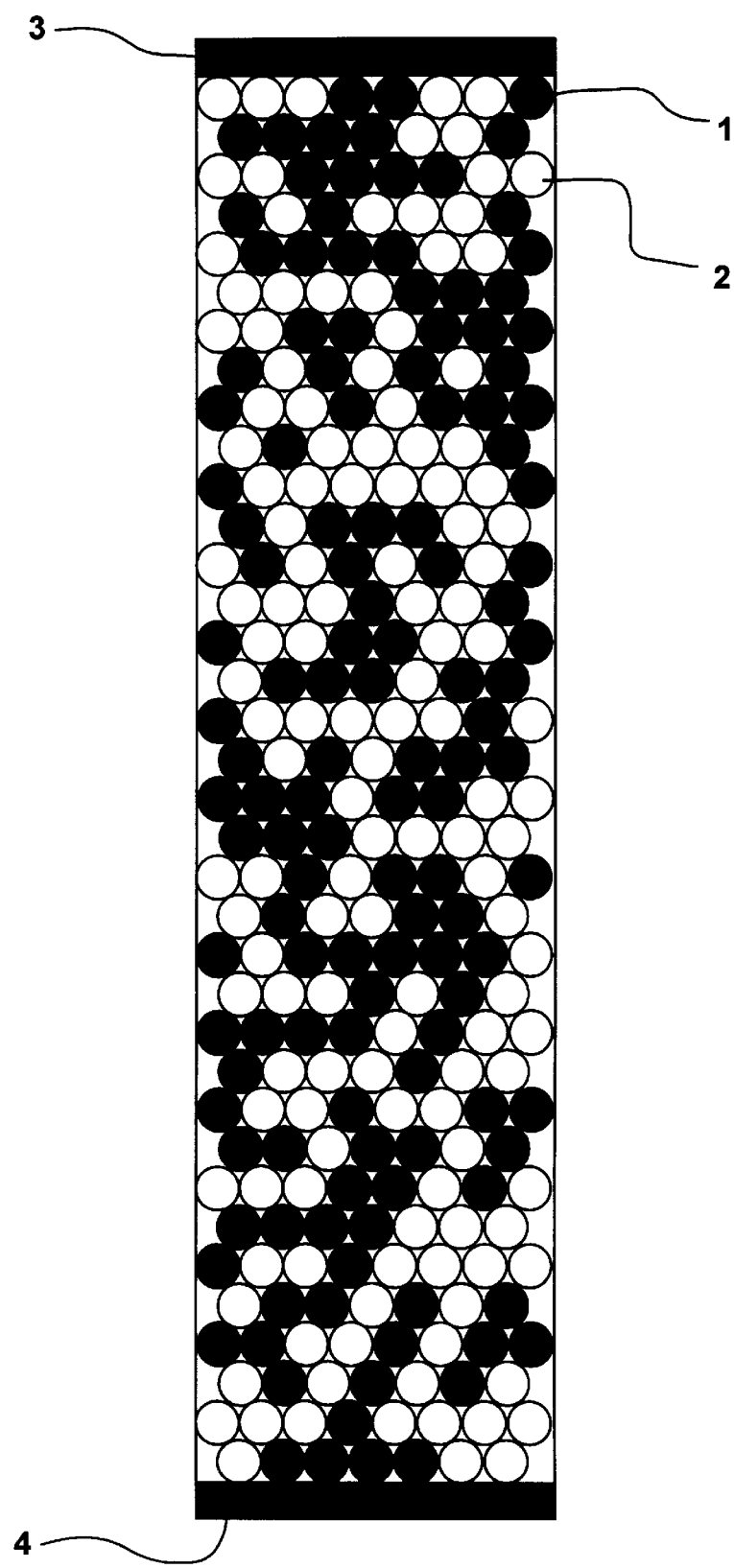
FIG. 1 is a schematic representation of a random packing containing pieces that are electrically conductive shown in black and pieces that are non-conductive shown in white. The proportion of conductive to non-conductive pieces is 50:50.

In one preferred embodiment, the invention concerns a column packing that comprises pieces or elements, some of which are electrically conductive and others which are non-conductive. These pieces are intimately mixed. Said column packing is for use in, for example, scrubbing sulfur dioxide and nitric oxide from waste gases and recovery of these gases as sulfuric acid and nitric acid respectively. The packing performs a dual function. All the pieces regardless of their electrical properties provide the gas-liquid interface for the absorption of the given gases from the waste gas stream. In addition, the conductive pieces serve as a bipolar electrode to achieve electrolysis of the dissolved gases. The non-conductive pieces form a matrix that acts as an insulator. In this manner, the bipolar elements are prevented from shorting, and current efficiency is improved.

The packing material may consist of random packing in which case the conductive and non-conductive pieces are randomly intermixed, i.e., scattered indiscriminately throughout the bed. In practice these pieces would consist of such common shapes as Raschig rings or Berl saddles. Alternatively, structured packing may be employed, in which case a prearranged pattern of conductive and non-conductive elements is used. The proportion of conductive to non-conductive pieces or elements is such that the non-conductive material provides an insulating matrix. In random packing, a minimum of about 30 percent non-conductive pieces is necessary to assure the integrity of the system.

DETAILED DESCRIPTION OF THE PREFERRED EMBODIMENTS

The present invention overcomes the limitations of the prior art by using a mixture of conductive and non-conductive packing materials. The effect can be appreciated by examining the boundary conditions. At one extreme, use of 100 percent conductive packing results in a tendency to form a short circuit as noted previously. At the other extreme, the use of 100 percent non-conductive packing reduces the scrubbing column to a single electrolytic cell with high internal resistance. At some intermediate blend of conductive and non-conductive packing materials, optimum results can be expected.

A better understanding of the invention is obtained by reference to the drawing figures. These figures show in two dimensions random packings that contain both conductive pieces 1 (colored black) and non-conductive (white) pieces 2. For the sake of simplicity, these pieces 1, 2 are shown as circles to depict balls, and they are packed without voids. Conceptually, these packings may be considered for use in a demonstration apparatus, as consisting of lead buck shot 1 and Teflon balls 2. At each end of the column, at the top and bottom, are positioned electrical contacts 3, 4 fabricated, for instance, from graphite.

The inventive concept is a column packing for use in the scrubbing of gases by aqueous liquid, said packing comprising material that is electrically conductive and material that is non-conductive with such materials being intimately mixed with each other, such that the packing as a whole provides the gas-liquid surface for absorption and the conductive material in particular serves as a bipolar electrode for electrolysis.

Several features of these packings are of interest:

First, in the 50—50 mix packing shown in FIG. 1, neither the conductive pieces nor the non-conductive pieces form a continuum. In this respect, the packing is unlike a liquid emulsion where one component acts as the outside phase or medium and the other as the inner phase or dispersoid. In emulsions the liquid which is present in excess will, as a rule, form the medium.

Second, both the white circles 2 and the black ones 1 form strands or clumps that are inter-tangled. The black strands stand out, appearing to be not unlike a neural network with each black body 1 or neuron connected to adjacent black ones. Carrying this analogy one step further, electrical impulses or signals are passed along these strands. The intimacy between the black and white strands are to be noted. This pattern makes for a highly interactive network, one, it seems, which is highly suitable for a bipolar electrode.

Figure 2:
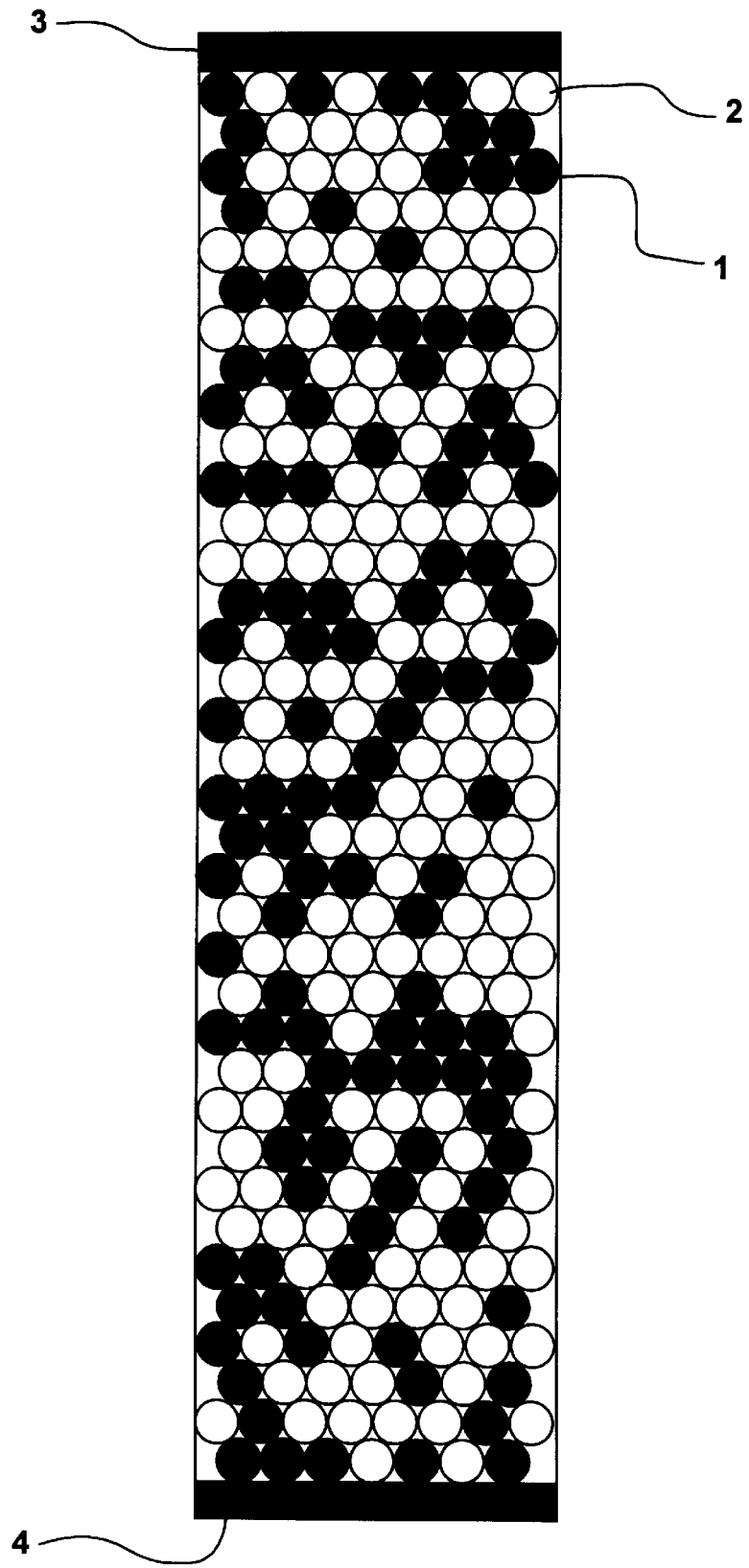
FIG. 2 is a diagram similar to that shown in FIG. 1, but with proportion of conductive to non-conductive pieces equal to 40:60.
Figure 3:
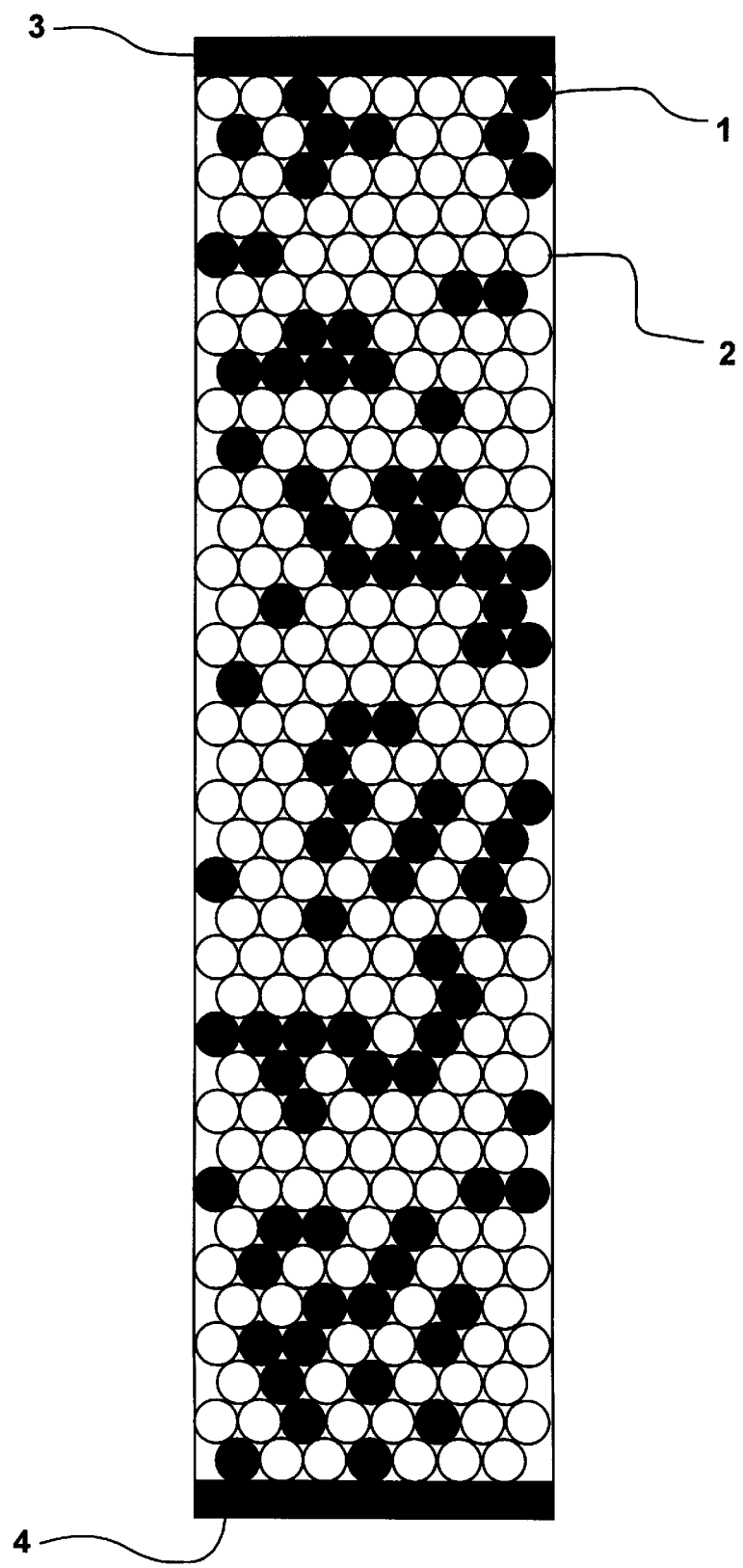
FIG. 3 likewise is similar to FIG. 1 but with the proportion of conductive to non-conductive pieces equal to 30:70.

Third, as the proportion of conductive bodies decreases, as shown in FIGS. 2 and 3, the strands become shorter and more dispersed. When the proportion of conductive bodies falls to 30 percent, the non-conductive bodies are capable of forming an uninterrupted matrix. Conversely, a minimum of about 30 percent non-conductive pieces is necessary to prevent an uninterrupted matrix of conductive pieces.

Because of the complexity of random packings, this system defies theoretical analysis. They should, however, lend themselves to empirical treatment. The packings can be considered as the equivalent of many small electrical cells. These cells are connected both in series and in parallel. First, considering the cells connected in parallel, the total capacity of such cells would be proportional to the electrical current. Next, looking at the cells connected in series, the capacity is proportional to the applied voltage. Overall, these relationships can be expressed by the following equation:

$$C = kVA$$

where C is the capacity of the scrubbing column, V is the voltage applied across the column, A is the electrical current, and k is a coefficient which depends on the packing characteristics.

Considering the above capacity expression, it might be instructive to examine again the boundary conditions. When using 100 percent conductive packing, the current will be large, but the voltage drop will be very low so that the capacity C will be small. On the other hand, with 100 percent non-conductive packing, the current will be extremely small even though the applied voltage is great. Again C is small.

Structured packings allow for the manipulation of the conductive and non-conductive elements. A desired pattern with high efficiency can be designed into the packing. The principle of operation, however, is the same as for random packings. Structured packings depend on the concept of bipolar electrodes arranged in such a manner that electrical shorting is avoided.

The applications for neural network packings are seen to be broad in scope. The examples given are not meant to be limiting. Nevertheless, the two most promising uses for this invention are the removal of sulfur dioxide and nitric oxide from waste gases. In general, however, the invention has usefulness in cases where there is a need to absorb a gas in aqueous solution and simultaneously electrolyze the resulting solute. By improving on the electrical efficiencies of such processes, neural network packings can make a significant contribution to the technology.

The embodiments of the invention in which exclusive property or privilege is claimed are defined as follows:

1. A column and a column packing for use in the scrubbing of gases by an aqueous liquid, said packing comprising electrically conductive pieces and non-conductive pieces, with such pieces being randomly intermixed and spaced between two electrical contacts, such that the packing as a whole provides the gas-liquid interface for absorption and the conductive pieces in particular serve as a bipolar electrode for electrolysis, the proportion of conductive to non-conductive pieces being sufficient to form strands or clumps of conductive pieces but less than the lowest proportion which causes an electrical shunt between the electrical contracts, said column having top and bottom ends on each of which said electrical contacts are positioned.

2. A column packing according to claim 1 where the proportion of conductive to non-conductive pieces is 50:50.

3. A column packing according to claim 1 where the proportion of conductive to non-conductive pieces is in the range of 50:50 to 70:30.

4. A column packing according to claim 1 where the proportion of conductive to non-conductive pieces is in the range of 40:60 to 50:50.

5. A column packing according to claim 1 where the proportion of conductive to non-conductive pieces is in the range of 30:70 to 40:60.

6. A column packing according to claim 1 where the packing is characterized by the relationship C=kVA where C is the capacity of the column packing, V is the applied voltage across the electrical contacts, A is the electrical current, and k is a constant.

* * * * *